United States Patent [19]

Mikula et al.

[11] Patent Number: 5,449,087
[45] Date of Patent: Sep. 12, 1995

[54] MOLDED PLASTIC DRUM

[75] Inventors: John J. Mikula, Kennesaw, Ga.; John H. Malik, Naperville, Ill.

[73] Assignee: Sonoco Products Company, Hartsville, S.C.

[21] Appl. No.: 118,038

[22] Filed: Sep. 8, 1993

[51] Int. Cl.⁶ .......................................... B65D 90/12
[52] U.S. Cl. .................................... 220/608; 220/606
[58] Field of Search .............. 220/604, 606, 601, 608, 220/669, 672, 675, 771, 770, DIG. 1, DIG. 6

[56] References Cited

U.S. PATENT DOCUMENTS

| | | |
|---|---|---|
| D. 200,842 | 4/1965 | Baranano . |
| D. 230,956 | 3/1974 | Bystedt et al. . |
| D. 287,461 | 12/1986 | Bussell . |
| D. 295,108 | 4/1988 | Pryztulla . |
| D. 319,133 | 8/1991 | Pryztulla . |
| D. 319,134 | 8/1991 | Pryztulla . |
| 997,556 | 7/1911 | Hoyer . |
| 1,413,907 | 4/1922 | Gerstenberger ............. 220/DIG. 6 |
| 2,132,722 | 10/1938 | Coakley . |
| 2,146,381 | 2/1939 | Rheem . |
| 2,381,386 | 8/1945 | Kuhn ............. 220/DIG. 1 |
| 2,686,610 | 8/1954 | Sharpnack, Sr. . |
| 2,711,264 | 6/1955 | Benson . |
| 2,936,481 | 5/1960 | Wilkalis et al. . |
| 2,936,489 | 5/1960 | Sherman . |
| 2,975,931 | 3/1961 | Harrison . |
| 3,004,285 | 10/1961 | Hagen . |
| 3,050,773 | 8/1962 | Hagen . |
| 3,129,730 | 4/1964 | Simon ............. 220/608 |
| 3,170,568 | 2/1965 | Carter . |
| 3,214,797 | 11/1965 | Ollier et al. . |
| 3,250,429 | 5/1966 | Gesell . |
| 3,294,271 | 12/1966 | Armbruster . |
| 3,298,514 | 1/1967 | Erickson . |
| 3,342,915 | 9/1967 | Wanderer . |
| 3,348,721 | 10/1967 | Trevarrow, Jr. . |
| 3,468,450 | 9/1969 | Webel ............. 220/DIG. 1 |
| 3,501,047 | 3/1970 | Raabe . |
| 3,516,571 | 6/1970 | Roper et al. . |
| 3,561,629 | 2/1971 | Turner . |
| 3,647,110 | 3/1972 | Hammes . |
| 3,650,653 | 3/1972 | Erickson . |
| 3,804,289 | 4/1974 | Churan . |
| 3,821,344 | 6/1974 | Peters . |
| 3,825,145 | 7/1974 | Reynolds . |
| 3,843,005 | 10/1974 | Uhlig . |
| 3,889,839 | 6/1975 | Simon et al. . |

(List continued on next page.)

FOREIGN PATENT DOCUMENTS

| | | | |
|---|---|---|---|
| 236860 | 11/1964 | Austria | 220/601 |
| 969114 | 6/1975 | Canada | 220/604 |
| 8802842 | 6/1990 | Netherlands | 220/601 |
| 2016402 | 9/1979 | United Kingdom | 220/604 |

*Primary Examiner*—Stephen J. Castellano
*Attorney, Agent, or Firm*—Bell, Seltzer, Park

[57] ABSTRACT

An integrally molded plastic drum having a cylindrical body, a top wall, and a bottom wall is provided. The bottom wall has a central recessed portion and an annular generally flat horizontal bottom wall portion surrounding the central recessed portion. The annular bottom wall portion has a first recess, a second recess, and a discrete hand engageable lifting indentation therein. The central recessed portion, first and second recesses, and the discrete lifting indentation collectively contain the molding parting line extending across the bottom wall of the drum. The top wall of the drum has a central concave portion which serves as a collection well in the event of spillage and also serves to facilitate the drainage of the drum when the drum is inverted. The top wall defines a pair of spaced apart bungholes therein. The bungholes are positioned in a diametrically opposing relation, with one of the bungholes serving as a filling spout and the other bunghole serving as a pouring spout. The top wall defining the pair of bungholes also defines internal threads for each bunghole, where the internal threads for the pouring spout are coarser than the internal threads for the filling spout. The discrete hand engageable lifting indentation is positioned directly below the filling spout and is of such a size as to be easily grasped by one's hand for manual lifting of the drum.

28 Claims, 6 Drawing Sheets

U.S. PATENT DOCUMENTS

| Number | Date | Name | Ref |
|---|---|---|---|
| 3,912,438 | 10/1975 | Padovani . | |
| 3,927,790 | 12/1975 | Chase et al. . | |
| 3,934,747 | 1/1976 | Needt . | |
| 3,938,687 | 2/1976 | Maier et al. . | |
| 3,949,034 | 4/1976 | Uhlig . | |
| 3,955,705 | 5/1976 | Dubois et al. . | |
| 3,985,257 | 10/1976 | Shaffer et al. . | |
| 4,023,679 | 5/1977 | Hammes . | |
| 4,033,473 | 7/1977 | Raley et al. | 220/604 |
| 4,088,239 | 5/1978 | Uhlig . | |
| 4,094,432 | 6/1978 | Zilbert . | |
| 4,169,537 | 10/1979 | Sabreen et al. . | |
| 4,170,623 | 10/1979 | Dubois et al. . | |
| 4,171,751 | 10/1979 | Schütz . | |
| 4,201,306 | 5/1980 | Dubois et al. . | |
| 4,209,104 | 6/1980 | Speas . | |
| 4,228,911 | 10/1980 | Hammes . | |
| 4,231,488 | 11/1980 | Ward et al. . | |
| 4,257,527 | 3/1981 | Snyder et al. . | |
| 4,264,016 | 4/1981 | Speas . | |
| 4,294,374 | 10/1981 | Ames . | |
| 4,372,458 | 2/1983 | Carlson . | |
| 4,378,328 | 3/1983 | Przytulla et al. . | |
| 4,380,303 | 4/1983 | Allen et al. . | |
| 4,385,709 | 5/1983 | Ames . | |
| 4,412,628 | 11/1983 | Whitney . | |
| 4,489,847 | 12/1984 | Ames . | |
| 4,500,007 | 2/1985 | Stoll, III . | |
| 4,525,401 | 6/1985 | Pocock et al. . | |
| 4,643,323 | 2/1987 | Schütz . | |
| 4,648,522 | 3/1987 | Wise . | |
| 4,674,648 | 6/1987 | Przytulla . | |
| 4,713,207 | 12/1987 | Udell et al. . | |
| 4,736,862 | 4/1988 | Hammes et al. . | |
| 4,767,021 | 8/1988 | Pies . | |
| 4,768,673 | 9/1988 | Przytulla . | |
| 4,779,754 | 10/1988 | Ten Eyck et al. | 220/DIG. 6 |
| 4,823,683 | 4/1989 | Meisner . | |
| 4,840,289 | 6/1989 | Fait et al. . | |
| 4,849,154 | 7/1989 | Masumoto . | |
| 4,898,296 | 2/1990 | Burgdorf et al. . | |
| 4,903,853 | 2/1990 | Masumoto . | |
| 4,925,049 | 5/1990 | Przytulla . | |
| 4,934,551 | 6/1990 | Burdenbender | 220/601 |
| 4,962,863 | 10/1990 | Wendling et al. . | |
| 4,972,963 | 11/1990 | Guarriello et al. . | |
| 5,018,642 | 5/1991 | Pyzytulla . | |
| 5,033,639 | 7/1991 | Przytulla . | |
| 5,044,510 | 9/1991 | Schutz | 220/606 |
| 5,346,094 | 9/1994 | Strawser | 220/DIG. 6 |

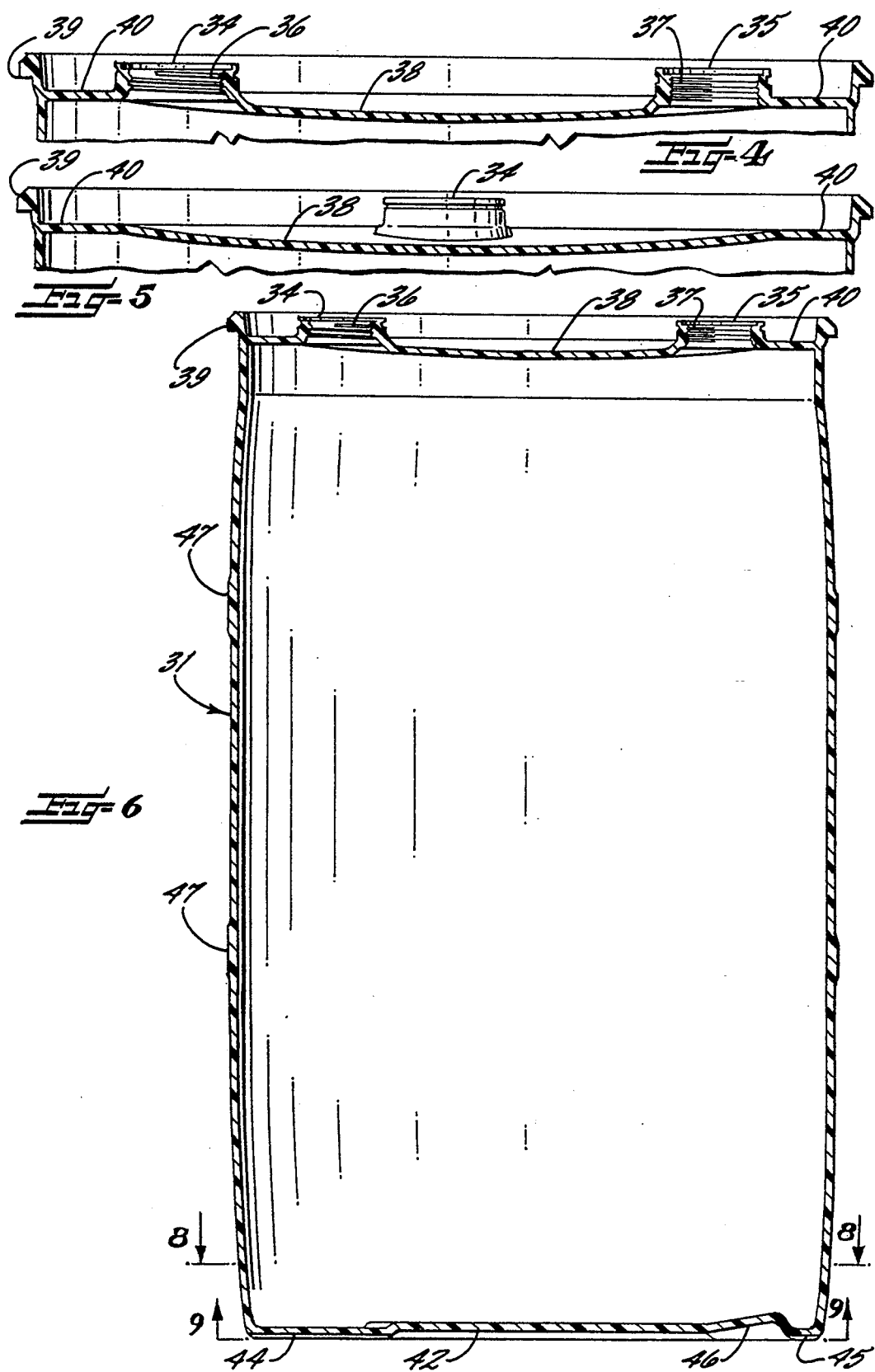

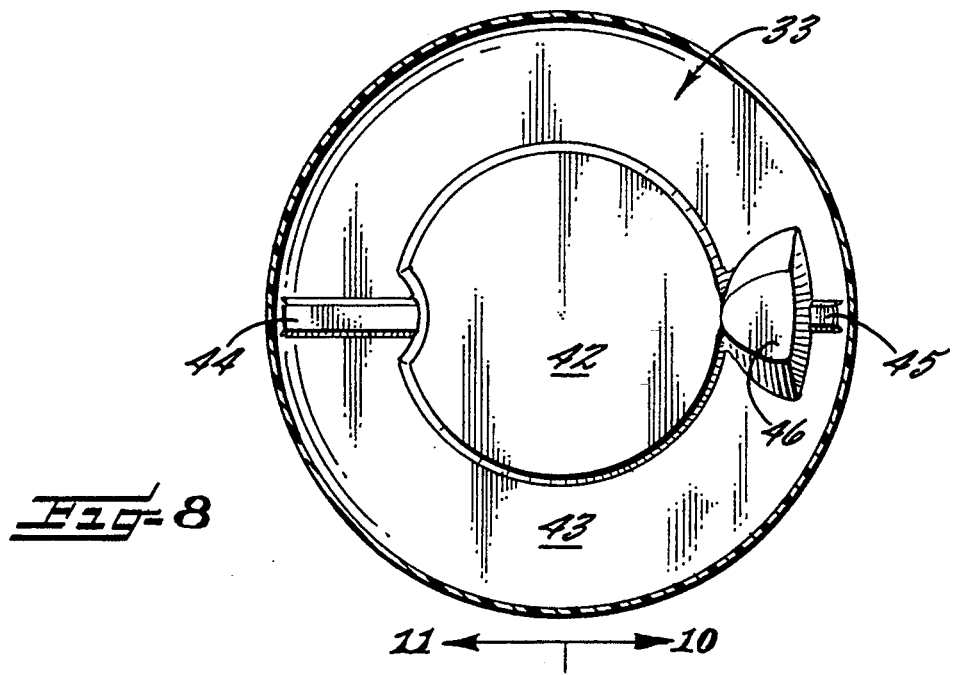
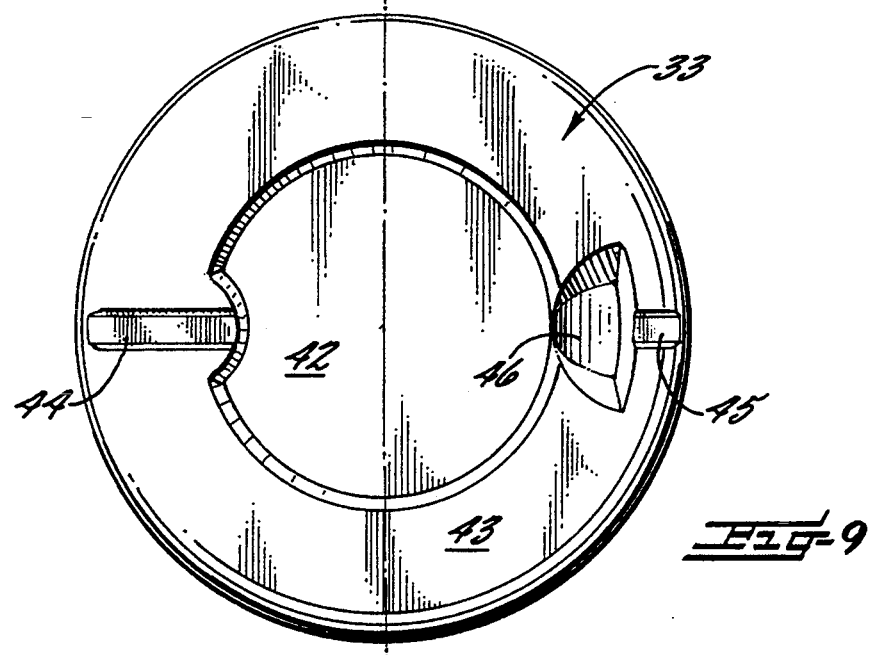
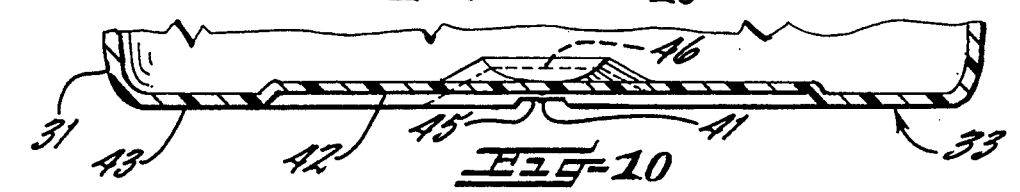
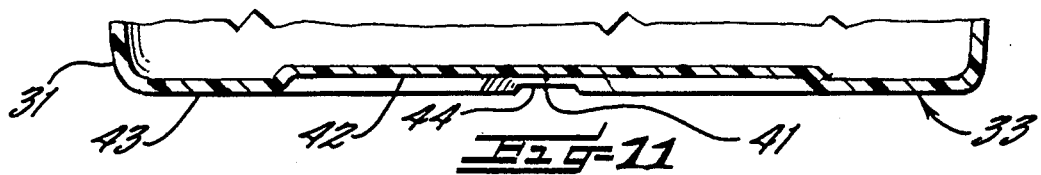

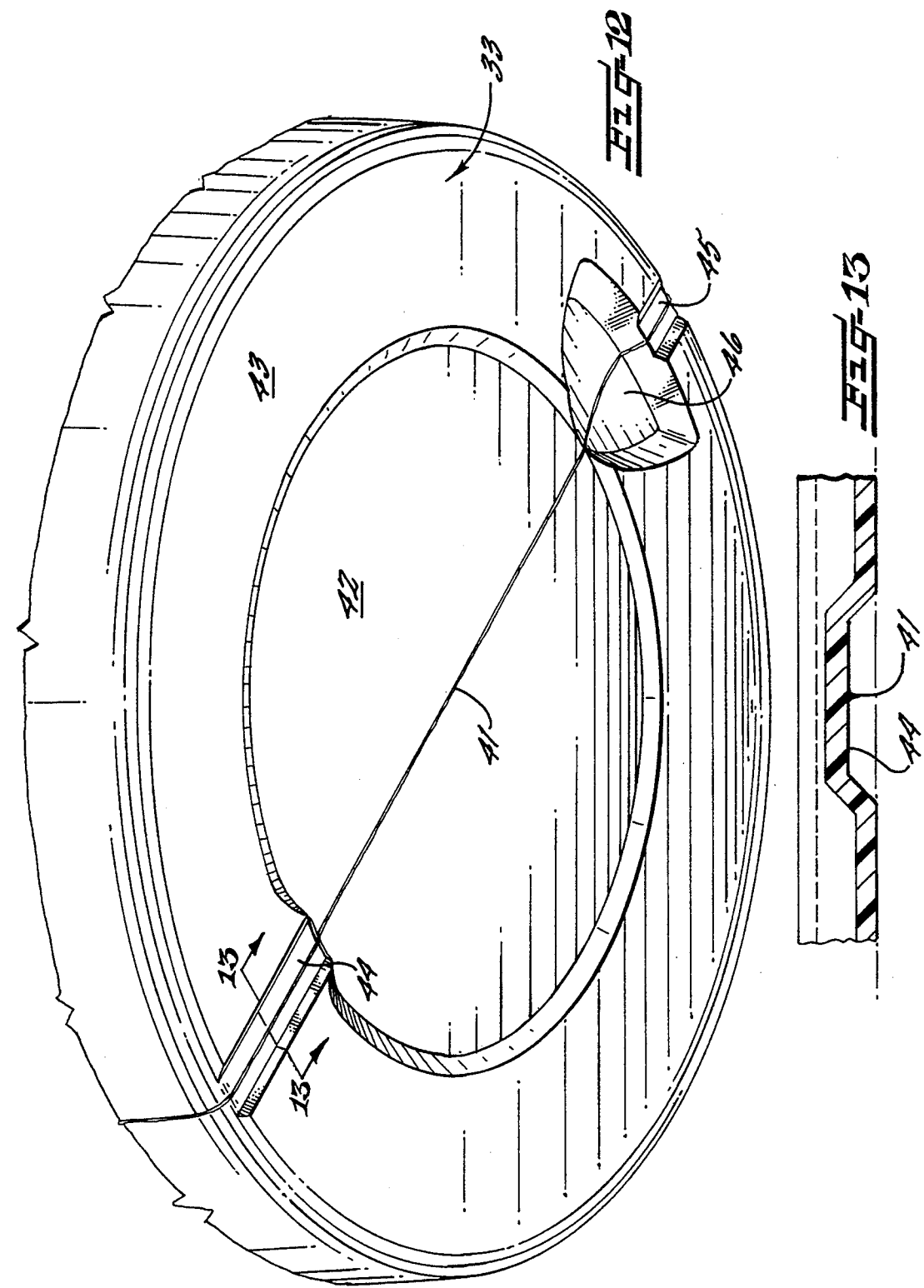

MOLDED PLASTIC DRUM

This invention relates to molded plastic drums, and more particularly, to a blow molded plastic drum.

This invention incorporates a number of desirable structural features in the molded drum to not only enhance and prolong the life of the drum, but to also permit ease of mechanical and manual handling and lifting of the drum. Also, the drum has further features incorporated therein to provide protection against spillage of contents on the ground and to facilitate emptying or draining residual contents from the drum when inverted. Further, the molded drum of this invention has its inherent protruding molding parting line extending across the bottom of the drum so located as to avoid interference with the drum resting flat on its bottom. This latter feature is accomplished without prior practices of filing or shaving away the protruding plastic material from the periphery of the drum.

It is therefore the primary object of this invention to provide a molded drum having the foregoing features incorporated therein so as to present a drum that is of long lasting use and easier to handle as compared to conventional molded drums.

It is a more specific feature of this invention to construct the bottom wall of the drum so that the molding parting line is recessed across the bottom of the drum to avoid interference with the drum resting flat on its bottom.

It is a further more specific feature of this invention to provide a discreet hand engageable lifting indentation or recess positioned directly below the filling spout of the drum and of such size as to be easily grasped by one's hand for manual lifting of the drum. This location of the hand engageable lifting indentation positions the same in the ideal location for grasping and effectively pouring the contents out of the drum pouring spout which is located diametrically across from the filling spout.

Other objects, features, and advantages of the invention will become more readily apparent from consideration of the following detailed description of the preferred embodiment of the invention when taken in conjunction with the accompanying drawings.

BRIEF DESCRIPTION OF THE DRAWINGS

FIG. 4 is a fragmentary cross sectional view taken along line 4—4 of FIG. 2.

FIG. 5 is a fragmentary cross sectional view taken along line 5—5 of FIG. 2.

FIG. 6 is a vertical cross sectional view taken along line 6—6 of FIG. 2.

FIG. 8 is an interior cross sectional view taken along line 8—8 in FIG. 6.

FIG. 9 is a bottom plan view of the plastic drum taken along line 9—9 in FIG. 6.

FIG. 10 is a fragmentary cross sectional view of the bottom wall taken along line 10—10 of FIG. 9.

FIG. 11 is a fragmentary cross sectional view taken along line 11—11 and looking in the opposite direction from FIG. 10.

FIG. 12 is an enlarged fragmentary perspective view of the bottom of the plastic drum.

FIG. 13 is an enlarged fragmentary cross sectional view taken along line 13—13 of FIG. 12.

DETAILED DESCRIPTION OF PREFERRED EMBODIMENT

The present invention will now be described more fully hereinafter with reference to the accompanying drawings, in which a preferred embodiment of the invention is shown.

Figure 1:
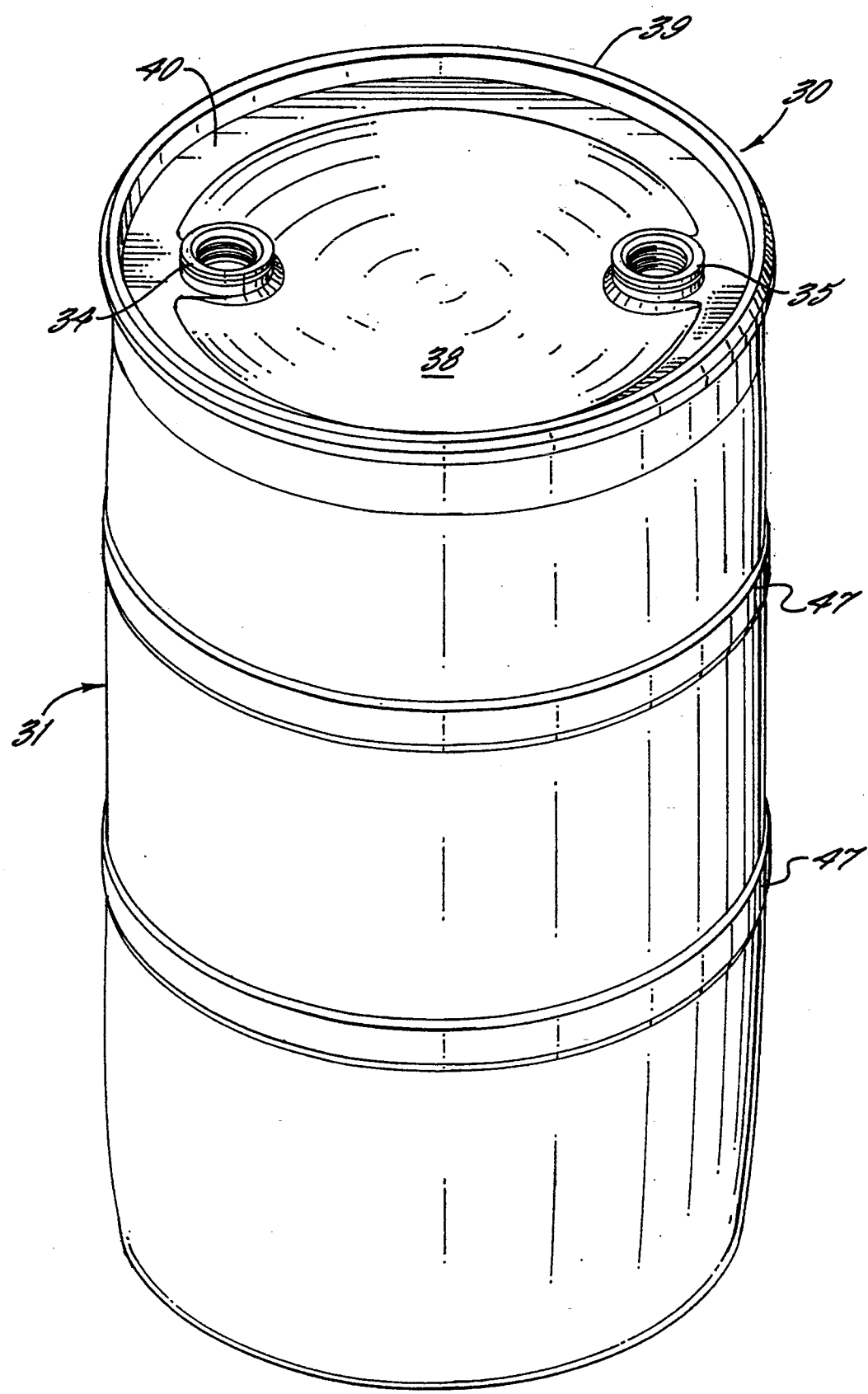
FIG. 1 is a perspective view of a plastic drum according to the invention.
Figure 2:
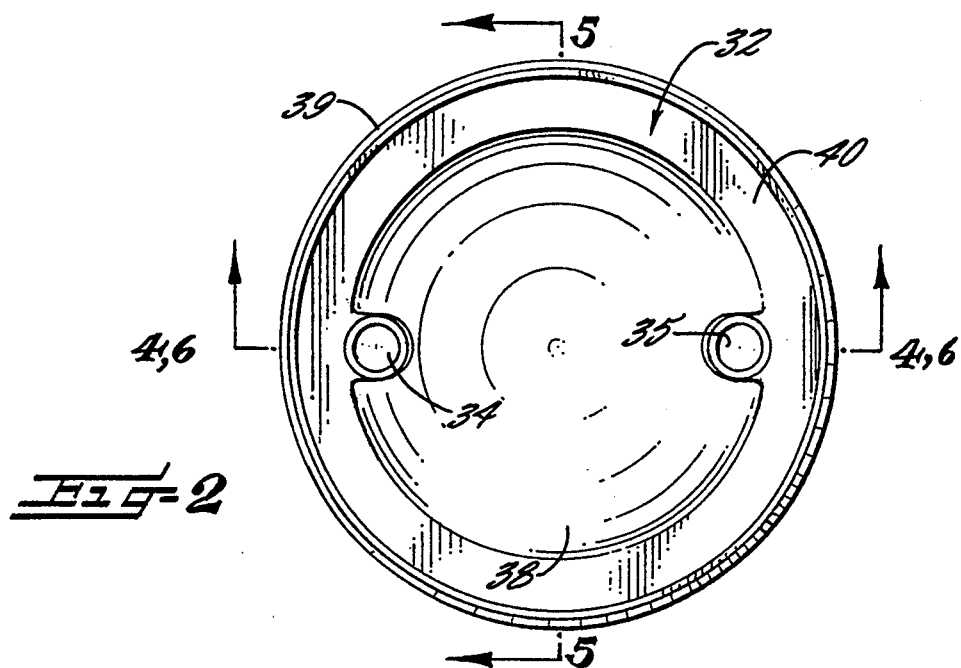
FIG. 2 is a top plan view thereof.
Figure 3:
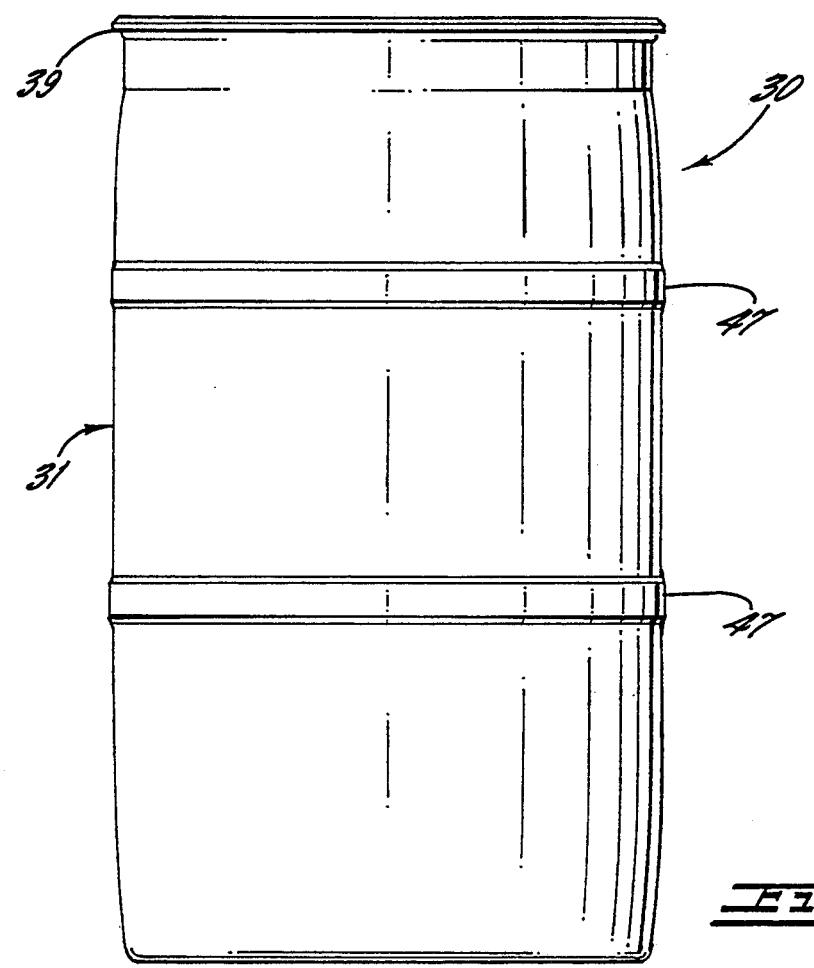
FIG. 3 is a side elevational view thereof.
Figure 7:
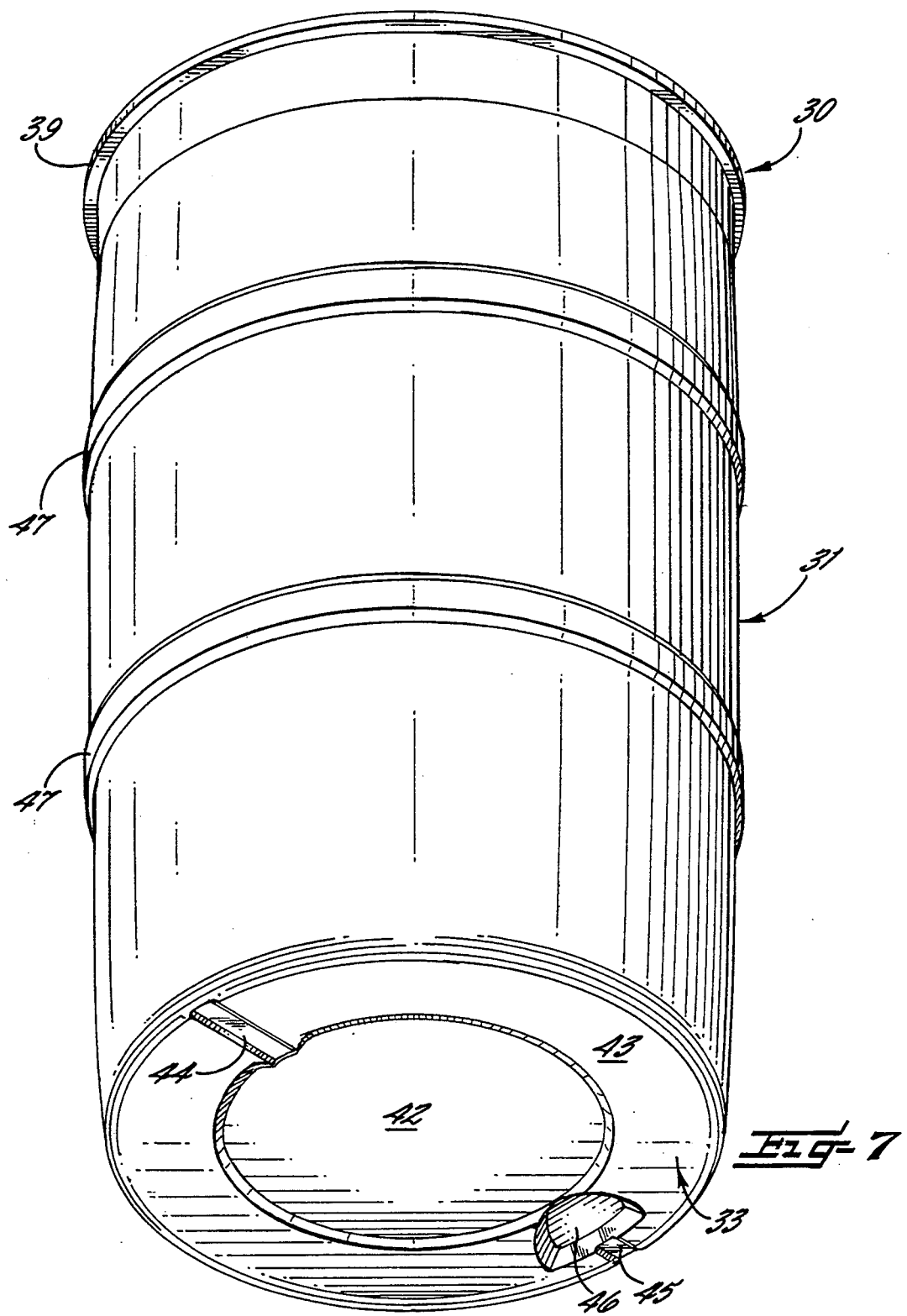
FIG. 7 is a bottom perspective view thereof.

An integrally molded plastic drum 30 according to the invention, illustrated in FIG. 1, includes a cylindrical body 31, a top wall 32, and a bottom wall 33. A pair of spaced apart upstanding bungholes 34, 35 are formed in the top wall and extend upwardly from the top wall and serve as spouts with each of the bungholes having respective internal threads 36, 37 which receive the bungs (not shown). As seen more clearly in FIG. 4, bunghole 34 has coarser internal threads 36 surrounding it than the threads 37 surrounding bunghole 35. The coarser threads 36 make it easier for an individual working with the drum 30 to remove the bung from the bunghole 34 which defines a pouring spout. The finer threads 37, therefore, define a filling spout bunghole.

The spacing between the pair of bungholes 35 36 is greater than the spacing from each of the bungholes to an adjacent periphery of the top wall 32 Essentially, the bungholes 35, 36 are in diametrically opposing relation, with a concave portion 38 between and partially surrounding portions of each of the bungholes 35, 36. The concave portion 38 in the top wall 32 is preferably dish-like and slopes from all directions toward the middle of the top wall. The concave portion 38 thereby defines central portions of the top wall 32 and serves as a collection well or dish in the event of spillage of the contents of the drum. As will be apparent, any spills are easily collected in the concave dish between the bungholes 35, 36. The dish-like shape also facilitates drainage of residual contents of the drum 30 when the drum is inverted. Preferably, the concave portion 38 is of such large extent as to extend from a distal portion of one bunghole to a distal portion of the other bunghole. A generally flat annular horizontal top wall portion 40 surrounds the pair of bungholes 35, 36.

An annular chime 39 is integrally formed with the upper end of the cylindrical body 31 and terminates above the height of the pair of bungholes 35, 36. The chime 39 is thus able to shield and protect the bungholes 35, 36 against damage from an overlying drum, for example. The principal role of the chime however, is that it provides a strong lifting member for drum lifting equipment. The chime 39 as illustrated, is thicker than the cylindrical body 31 so as to provide sufficient strength for the lifting of the drum 30 thereby when filled.

The drum 30 has a molding parting line 41 (best shown in FIG. 12) which circumscribes the entire drum 30 and protrudes outwardly from the top wall 32, bottom wall 33, and the cylindrical body 31 of the drum 30 and defines a ridge that bisects the molded drum 30 in longitudinal halves. Molding parting lines, which are an inherent feature of a molding process are formed when the two halves of a mold come together and plastic is blown or injected into the mold. Any gap left where the two mold halves come together results in a molding parting line defined by a ridge of the plastic material.

As shown in FIGS. 7-13, the bottom wall 33 has a central recessed portion 42 and an annular generally flat horizontal bottom wall portion 43 surrounding the central recessed portion 42. The annular bottom wall portion 43 has a first recess 44, a second recess 45, and a discrete hand engageable lifting indentation 46 therein. The discrete hand engageable lifting indentation 46 is of such a size as to be easily grasped manually by a plurality of fingers of one's hand for manual lifting of the drum 30. The central recessed portion 42, the first and second recesses 44, 45, and the discrete lifting indentation 46 collectively define a continuous recess to contain the molding parting line 41 extending across the bottom wall 33 of the drum 30 so that the molding parting line 41 is entirely recessed and will not interfere with the drum 30 resting flat on its bottom wall.

By recessing the molding parting line 41, a manufacturer may avoid expensive high precision alterations to drum molds. Further, it is unnecessary to shave or remove a molding parting line from a drum. The end product of this invention is thus more stable, less expensive to manufacture, and can be manufactured more quickly.

The lifting indentation 46 is recessed to a greater depth than the central recessed portion 42 or the first or second recesses 44, 45, as shown most clearly in FIGS. 6 and 12. This deeper cavity allows one's fingers to get a secure grip. The position of the lifting indentation 46 in the bottom wall 33 is directly below the filling spout 35 to thus be in the ideal location for grasping and effectively pouring the contents from the drum 30 out of the diametrically disposed pouring spout 36. The first and second recesses 44, 45, generally of an inverted trough shape, only need to be deep enough to receive the molding parting line 41. Any additional depth would unnecessarily waste production material. The central recessed portion 42 is somewhat deeper than the first or second recesses 44, 45 to take into account irregularities in the surface upon which the drum 30 rests, yet still provide a sturdy resting surface by way of the flat annular bottom wall portion 43 of the drum 30. The central recessed portion 42 in the bottom wall 33 is preferably generally circular and as shown encompasses over half of the area of the bottom wall 33.

The cylindrical body 31 has a plurality of integrally formed spaced apart annular reinforcing bands 47 extending outwardly from a medial portion of the cylindrical body 31. The reinforcing bands 47 serve as ground engaging areas in the event someone desires to transport the drum 30 by rolling. Strength and drum integrity are also enhanced by providing the reinforcing bands 47. The medial portion of the drum's cylindrical body 31 on which the reinforcing bands 47 are placed preferably has an outward bulge so that any wearing or depletion of the rolling surface occurs first on the reinforcing bands 47 which are much thicker than the wall of the cylindrical body.

It is to be understood that the invention is not to be limited to the specific embodiment disclosed, and that many modifications and other embodiments are intended to be included within the scope of the appended claims.

What is claimed is:

1. An integrally molded plastic drum comprising:
    a cylindrical body;
    a top wall and a bottom wall integrally molded with respective upper and lower ends of said cylindrical body;
    means defining a pair of spaced apart bungholes formed in said top wall and extending upwardly from the top wall, the spacing between said pair of bungholes being greater than the spacing from each of said bungholes to an adjacent periphery of said top wall;
    said top wall having a concave portion defining central portions of said top wall, said concave portion serving as a collection well in the event of spillage and also serving to facilitate the drainage of the drum when the drum is inverted;
    said bottom wall having a discrete hand engageable lifting indentation therein of such a size as to be grasped manually by a plurality of fingers of one's hand for manual lifting of the drum;
    an annular chime integrally formed with the upper end of said cylindrical body and extending upwardly thereabove and terminating above the height of said means defining said pair of bungholes; and
    a molding parting line, inherent in molding, which circumscribes the drum and protrudes outwardly from the top wall, bottom wall and cylindrical body of the drum and defines a ridge that bisects the molded drum in longitudinal halves, said bottom wall further having a central recessed portion and an annular generally flat horizontal bottom wall portion surrounding said central recessed portion, said annular bottom wall portion having first and second recesses therein, and wherein said central recessed portion, said first and second recesses and said discrete lifting indentation collectively contain said molding parting line extending across the bottom wall of the drum so that the molding parting line is recessed and will not interfere with the drum resting flat on its bottom wall.

2. A molded drum according to claim 1 wherein said bottom wall has a central recessed portion and wherein said discrete hand engageable lifting indentation is recessed to a greater depth than said central recessed portion.

3. A molded drum according to claim 2 wherein said central recessed portion in said bottom wall is generally circular and encompasses over one half the area of said bottom wall.

4. A molded drum according to claim 1 wherein said first and second recesses are generally inverted trough shape.

5. A molded drum according to claim 1 wherein said cylindrical body has a plurality of integrally formed spaced apart annular reinforcing bands extending outwardly from a medial portion of said cylindrical body and serving to provide ground engaging areas in the event one desires to roll the drum for transporting the same and for also providing added reinforcement to the cylindrical body of the drum.

6. A molded drum according to claim 5 wherein said cylindrical body of the drum has an outward bulge in the medial portions thereof, and wherein said spaced apart annular reinforcing bands are positioned on the outwardly bulging medial portions.

7. A molded drum according to claim 1 wherein said bungholes are positioned in diametrically opposing relation and wherein one of said bungholes defined by said means serves as a spout for filling the drum and the other bunghole defined by said means serves as a spout for pouring contents from the drum, wherein said means defining said pair of upwardly extending bungholes also defines internal threads for each bunghole, wherein the internal threads for one bunghole are coarser than the internal threads for the other bunghole and respectively define the pouring spout and the filling spout, and wherein said lifting indentation in said bottom wall is positioned directly below said filling spout to thus be in the ideal location for grasping and effecting pouring of contents from the drum out of said pouring spout.

8. A molded drum according to claim 1 wherein said concave portion in said top wall is dish-like and slopes from all directions toward the middle of the top wall.

9. A molded drum according to claim 1 wherein said concave portion is of such large extent as to extend from a distal portion of one bunghole to a distal portion of the other bunghole.

10. An integrally molded plastic drum comprising:
  a cylindrical body;
  a top wall and a bottom wall integrally molded with respective upper and lower ends of said cylindrical body;
  means defining a pair of spaced apart bungholes formed in said top wall and extending upwardly from the top wall, the spacing between said pair of bungholes being greater than the spacing from each of said bungholes to an adjacent periphery of said top wall;
  said top wall having an annular generally flat horizontal top wall portion surrounding said means defining said pair of bungholes, and a concave portion defining central portions of said top wall and being bounded and surrounded by said flat annular top wall portion, said concave portion serving as a collection well in the event of spillage and also serving to facilitate the drainage of the drum when the drum is inverted;
  said bottom wall having a discrete hand engageable lifting indentation therein of such a size as to be grasped manually by a plurality of fingers of one's hand for manual lifting of the drum;
  an annular chime integrally formed with the upper end of said cylindrical body and extending upwardly thereabove, said chime having a thickness greater than the thickness of said cylindrical body so as to provide sufficient strength for the lifting of the drum thereby when filled; and
  a molding parting line, inherent in molding, which circumscribes the drum and protrudes outwardly from the top wall, bottom wall and cylindrical body of the drum and defines a ridge that bisects the molded drum in longitudinal halves, said bottom wall further having a central recessed portion, and an annular generally flat horizontal bottom wall portion surrounding said central recessed portion, said annular bottom wall portion having first and second recesses therein, and wherein said central recessed portion, said first and second recesses and said discrete lifting indentation collectively contain said molding parting line extending across the bottom wall of the drum so that the molding parting line is recessed and will not interfere with the drum resting flat on its bottom wall.

11. A molded drum according to claim 10 wherein said bottom wall has a central recessed portion and wherein said discrete hand engageable lifting indentation is recessed to a greater depth than said central recessed portion.

12. A molded drum according to claim 11 wherein said central recessed portion in said bottom wall is generally circular and encompasses over one half the area of said bottom wall.

13. A molded drum according to claim 10 wherein said cylindrical body has a plurality of integrally formed spaced apart annular reinforcing bands extending outwardly from a medial portion of said cylindrical body and serving to provide ground engaging areas in the event one desires to roll the drum for transporting the same and for also providing added reinforcement to the cylindrical body of the drum.

14. A molded drum according to claim 13 wherein said cylindrical body of the drum has an outward bulge in the medial portions thereof, and wherein said spaced apart annular reinforcing bands are positioned on the outwardly bulging medial portions.

15. A molded drum according to claim 10 wherein said bungholes are positioned in diametrically opposing relation and wherein one of said bungholes defined by said means serves as a spout for filling the drum and the other bunghole defined by said means serves as a spout for pouring contents from the drum, and wherein said means defining said pair of upwardly extending bungholes also defines internal threads for each bunghole, wherein the internal threads for one bunghole are coarser than the internal threads for the other bunghole and respectively define the pouring spout and the filling spout, and wherein said lifting indentation in said bottom wall is positioned directly below said filling spout to thus be in the ideal location for grasping and effecting pouring of contents from the drum out of said pouring spout.

16. A molded drum according to claim 10 wherein said annular chime has uppermost portions terminating above the height of said means defining said pair of bungholes.

17. A molded drum according to claim 10 wherein said concave portion in said top wall is dish-like and slopes from all directions toward the middle of the top wall.

18. A molded drum according to claim 10 wherein said concave portion is of such large extent as to extend from a distal portion of one bunghole to a distal portion of the other bunghole.

19. An integrally molded plastic drum comprising:
  a cylindrical body;
  a top wall and a bottom wall integrally molded with respective upper and lower ends of said cylindrical body;
  means defining a pair of spaced apart bungholes formed in said top wall and extending upwardly from the top wall, the spacing between said pair of bungholes being greater than the spacing from each of said bungholes to an adjacent periphery of said top wall;
  said top wall having an annular generally flat horizontal top wall portion surrounding said means defining said pair of bungholes, and a concave portion defining central portions of said top wall and being bounded and surrounded by said flat annular top wall portion, said concave portion being of such extent as to extend from a distal portion of one bunghole to a distal portion of the other bunghole, said concave portion being dish-like and sloping from all directions toward the middle of the top wall and serving as a collection well in the event of spillage and also serving to facilitate the drainage of the drum when the drum is inverted;

said bottom wall having a hand engageable lifting indentation therein of such a size as to be grasped manually by a plurality of fingers of one's hand for manual lifting of the drum;

said cylindrical body having a plurality of integrally formed spaced apart annular reinforcing bands extending outwardly from a medial portion of said cylindrical body and serving to provide ground engaging areas in the event one desires to roll the drum for transporting the same and for also providing added reinforcement to the cylindrical body of the drum, and wherein said cylindrical body of said drum has an outward bulge in the medial portions thereof, and wherein said spaced apart annular reinforcing bands are positioned on the outwardly bulging medial portions;

an annular chime integrally formed with the upper end of said cylindrical body and extending upwardly thereabove, said chime having a thickness greater than the thickness of said cylindrical body so as to provide sufficient strength for the lifting of the drum thereby when filled; and a molding parting line, inherent in molding, which circumscribes the drum and protrudes outwardly from the top wall bottom wall and cylindrical body of the drum and defines a ridge that bisects the molded drum in longitudinal halves, said bottom wall further having a central recessed portion and an annular generally flat horizontal bottom wall portion surrounding said central recessed portion, said annular bottom wall portion having first and second recesses therein, and wherein said central recessed portion, said first and second recesses and said discrete lifting indentation collectively contain said molding parting line extending across the bottom wall of the drum so that the molding parting line is recessed and fill not interfere with the drum resting flat on its bottom wall.

20. A molded drum according to claim 19 wherein said bottom wall has a central recessed portion and wherein said hand engageable lifting indentation is recessed to a greater depth than said central recessed portion.

21. A molded drum according to claim 20 wherein said central recessed portion in said bottom wall is generally circular and encompasses over one half the area of said bottom wall.

22. An integrally molded plastic drum comprising:
a cylindrical body;
a top wall and a bottom wall integrally molded with respective upper and lower ends of said cylindrical body;
means defining a pair of spaced apart bungholes formed in said top wall and extending upwardly from the top wall, the spacing between said pair of bungholes being greater than the spacing from each of said bungholes to an adjacent periphery of said top wall;
said top wall having an annular generally flat horizontal top wall portion surrounding said means defining said pair of bungholes, and a concave portion defining central portions of said top wall and being bounded and surrounded by said flat annular top wall portion, said concave portion serving as a collection well in the event of spillage and also serving to facilitate the drainage of the drum when the drum is inverted;
an annular chime integrally formed with the upper end of said cylindrical body and extending upwardly thereabove, said chime having a thickness greater than the thickness of said cylindrical body so as to provide sufficient strength for the lifting of the drum thereby when filled; and
a molding parting line, inherent in molding, which circumscribes the drum and protrudes outwardly from the top wall, bottom wall and cylindrically body of the drum add defines a ridge that bisects the molded drum in longitudinal said bottom wall further having a central recessed portion and an annular generally flat horizontal bottom wall portion surrounding said central recessed portion, said annular bottom wall portion having first and second recesses therein, and wherein said central recessed portion, said first and second recesses collectively contain said molding parting line extending across the bottom wall of the drum so that the molding parting line is recessed and will not interfere with the drum resting flat on its bottom wall.

23. A molded drum according to claim 22 wherein said cylindrical body has a plurality of integrally formed spaced apart annular reinforcing bands extending outwardly from a medial portion of said cylindrical body and serving to provide ground engaging areas in the event one desires to roll the drum for transporting the same and for also providing added reinforcement to the cylindrical body of the drum.

24. A molded drum according to claim 23 wherein said cylindrical body of the drum has an outward bulge in the medial portions thereof, and wherein said spaced apart annular reinforcing bands are positioned on the outwardly bulging medial portions.

25. A molded drum according to claim 22 wherein said bungholes are positioned in diametrically opposing relation and wherein one of said bungholes defined by said means serves as a spout for filling the drum and the other bunghole defined by said means serves as a spout for pouring contents from the drum, and wherein said means defining said pair of upwardly extending bungholes also defines internal threads for each bunghole, wherein the internal threads for one bunghole are coarser than the internal threads for the other bunghole and respectively define the pouring spout and the filling spout.

26. A molded drum according to claim 22 wherein said annular chime has uppermost portions terminating above the height of said means defining said pair of bungholes.

27. A molded drum according to claim 22 wherein said concave portion in said top wall is dish-like and slopes from all directions toward the middle of the top wall.

28. A molded drum according to claim 22 wherein said concave portion is of such large extent as to extend from a distal portion of one bunghole to a distal portion of the other bunghole.

* * * * *

UNITED STATES PATENT AND TRADEMARK OFFICE
CERTIFICATE OF CORRECTION

PATENT NO. : 5,449,087
DATED : September 12, 1995
INVENTOR(S) : John J. Mikula and John H. Malik It is certified that error appears in the above-identified patent and that said Letters Patent is hereby corrected as shown below:

ON THE COVER PAGE: under item [56],

Reference Cited, U.S. Patent Documents, page 2, "Burdenbender" should be -- Büdenbender --; "Schutz" should be -- Schütz --.

Column 2, line 7, "EMBODIMENT" should be -- EMBODIMENTS --; column 2, line 27, "35 36" should be 35,36 --; line 29, after "32" insert a period (.); line 52, after "chime" insert -- 39, --.

IN THE CLAIMS:

Column 7, line 27, before "bottom" insert a comma (,); line 39, "fill" should be -- will --.

Column 8, line 14, "cylindrically" should be -- cylindrical --; line 15, "add" should be -- and --; line 16, after "longitudinal" insert -- halves --

Signed and Sealed this

Ninth Day of January, 1996

BRUCE LEHMAN

*Attest:*

*Attesting Officer*  *Commissioner of Patents and Trademarks*